(12) United States Patent
Schaefer et al.

(10) Patent No.: US 9,755,754 B2
(45) Date of Patent: Sep. 5, 2017

(54) ELECTRO-ABSORPTION MODULATOR ADAPTIVE EQUALIZER SYSTEMS AND METHODS

(71) Applicant: Lockheed Martin Corporation, Bethesda, MD (US)

(72) Inventors: Andrew F. Schaefer, Binghamton, NY (US); John C Ceccherelli, Owego, NY (US); Paul T. Coyne, Endicott, NY (US); Daniel S. Parsons, Owego, NY (US); Stephen V. Robertson, Aurora, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 61 days.

(21) Appl. No.: 14/630,638

(22) Filed: Feb. 24, 2015

(65) Prior Publication Data
US 2016/0248609 A1 Aug. 25, 2016

(51) Int. Cl.
*H04B 10/50* (2013.01)
*H04B 10/548* (2013.01)
(Continued)

(52) U.S. Cl.
CPC ..... *H04B 10/50595* (2013.01); *G02F 1/0123* (2013.01); *H04B 10/548* (2013.01); *H04L 25/03159* (2013.01)

(58) Field of Classification Search
CPC ........... H04B 10/504–10/50597; G02F 1/0123
See application file for complete search history.

(56) References Cited

U.S. PATENT DOCUMENTS

| 5,572,873 A | 11/1996 | Lavigne et al. |
| 5,603,220 A | 2/1997 | Seaman |

(Continued)

FOREIGN PATENT DOCUMENTS

| EP | 2315074 A1 | 8/1993 |
| WO | WO/2008/134436 A1 | 8/1993 |

(Continued)

OTHER PUBLICATIONS

Nonfinal Office Action dated Aug. 22, 2016, in U.S. Appl. No. 14/788,777.

(Continued)

*Primary Examiner* — David Payne
*Assistant Examiner* — Casey Kretzer
(74) *Attorney, Agent, or Firm* — Miles & Stockbridge PC (57) ABSTRACT

A system and method for adaptive equalization in a communication system. The system can include a modulator, a processor coupled to the modulator, and a memory coupled to the processor. The memory can store software instructions that, when executed by the processor, cause the processor to perform operations that can include generating, for each of one or more scan frequencies of interest, an optimal bias setting of the modulator. Data indicating a selection of a range of frequencies to be processed by the communication system can be received at the processor. The operations can include determining, responsive to the receiving, the optimal bias setting corresponding to the selected range of frequencies. A bias of the modulator can be adjusted based on the determined optimal bias setting, the adjusting providing adaptive equalization of the flatness response of the communication system.

24 Claims, 6 Drawing Sheets

(51) Int. Cl.
*H04L 25/03* (2006.01)
*G02F 1/01* (2006.01)

(56) References Cited

U.S. PATENT DOCUMENTS

| | | | |
|---|---|---|---|
| 5,822,102 | A | 10/1998 | Bodeep et al. |
| 6,476,957 | B1 | 11/2002 | Ward et al. |
| 7,245,833 | B1 | 7/2007 | Volkening |
| 8,061,149 | B1 | 11/2011 | Gowans et al. |
| 8,472,806 | B2 | 6/2013 | Woodward et al. |
| 8,538,270 | B2 | 9/2013 | Seidel et al. |
| 8,593,581 | B2 | 11/2013 | Mccarthy et al. |
| 2002/0021463 | A1 | 2/2002 | Turner et al. |
| 2002/0075546 | A1 | 6/2002 | Webb |
| 2002/0076132 | A1 | 6/2002 | Peral et al. |
| 2003/0002046 | A1 | 1/2003 | Myers et al. |
| 2003/0142701 | A1 | 7/2003 | Pontis et al. |
| 2003/0142702 | A1 | 7/2003 | Pontis et al. |
| 2004/0211900 | A1 | 10/2004 | Johnson |
| 2004/0218931 | A1* | 11/2004 | Frederiksen, Jr. .... G02F 1/0123 398/198 |
| 2006/0034616 | A1* | 2/2006 | Tipper ................. G02F 1/0123 398/186 |
| 2006/0239686 | A1 | 10/2006 | Hillis et al. |
| 2008/0106780 | A1* | 5/2008 | Niiho et al. ............ G02F 1/225 359/259 |
| 2008/0187319 | A1 | 8/2008 | Stewart et al. |
| 2008/0273561 | A1 | 11/2008 | Fu et al. |
| 2009/0003840 | A1* | 1/2009 | Nahapetian et al. ................. H04B 10/50575 398/183 |
| 2009/0036077 | A1 | 2/2009 | Woodward et al. |
| 2009/0268766 | A1* | 10/2009 | Ishibashi ............. H01S 5/06832 372/38.02 |
| 2009/0297155 | A1 | 12/2009 | Weiner et al. |
| 2009/0324251 | A1 | 12/2009 | Ilchenko et al. |
| 2010/0054757 | A1* | 3/2010 | Smith et al. .......... G02F 1/0123 398/198 |
| 2010/0230621 | A1 | 9/2010 | Rideout et al. |
| 2011/0059709 | A1 | 3/2011 | Collins, III |
| 2011/0150485 | A1 | 6/2011 | Seidel et al. |
| 2012/0002972 | A1 | 1/2012 | Stiffler et al. |
| 2012/0293959 | A1 | 11/2012 | Trudel et al. |
| 2013/0236187 | A1 | 9/2013 | Middleton et al. |
| 2015/0110494 | A1 | 4/2015 | Ghelfi et al. |
| 2016/0245557 | A1 | 8/2016 | Schaefer et al. |
| 2016/0248609 | A1 | 8/2016 | Schaefer et al. |
| 2017/0003524 | A1 | 1/2017 | Schaefer et al. |
| 2017/0005732 | A1 | 1/2017 | Schaefer et al. |

FOREIGN PATENT DOCUMENTS

| | | |
|---|---|---|
| WO | WO/2007/053477 A3 | 10/2010 |
| WO | WO/2013/117216 A1 | 8/2013 |

OTHER PUBLICATIONS

Vikram Sekar, Kamran Entesari. Inductively-loaded RF MEMS Reconfigurable Filters, International Journal of RF and Microwave Computer-Aided Engineering, 2009.

Kamran Entesari, Gabriel M. Rebeiz. A Differential 4-bit 6.5-10Ghz RF MEMS Tunable Filter, IEEE Transactions on Microwave Theory and Techniques, vol. 53, No. 3, Mar. 2005.

Ignacio Llamas-Garro, Zabdiel Brito-Brito. Reconfigurable Microwave Filters, Microwave and Millimeter Wave Technologies from Phtonic Bandgap Devices to Antenna and Applications, Igor Minin (Ed.), ISBN: 978-953-7619-66-4. InTech. pp. 159-184.

Seung-Hun Lee, Hyuung-Jun Kin, Jong-In Song. Broadband photonic single sideband frequency up-converter based on the cross polarization modulation effect in a semiconductor optical amplifier for radio-over-fiber systems. Optics Express. Optical Society of America. vol. 22, No. 1. Jan. 2014.

Liam Riordan. Discrete- and Integrated Control of Power Amplifiers in Base-Station Applications, Analog Dialogue 42-04, Apr. 2009.

Mani Hossein-Zadeh, Kerry J. Vahala. Photonic RF Down-Converter Based on Optomechanical Oscillation. IEEE Photonics Technology Letters, vol. 20, No. 4. Feb. 15, 2008.

Avigor Brillant. Chapter 13, Laser Power and Temperature Control Loops, Digital and analog fiber optic communications for CATV and FTTx applications. ISBN: 978-0-8194-6757-7. 2008.

Nonfinal Office Action dated Oct. 21, 2016, in U.S. Appl. No. 14/630,639.

Notice of Allowance dated Jan. 19, 2017, in U.S. Appl. No. 14/788,777.

Notice of Allowance dated Mar. 1, 2017, in U.S. Appl. No. 14/788,785.

Notice of Allowance dated Mar. 9, 2017, in U.S. Appl. No. 14/630,639.

Nonfinal Office Action dated Sep. 22, 2016, in U.S. Appl. No. 14/788,785.

\* cited by examiner

ELECTRO-ABSORPTION MODULATOR ADAPTIVE EQUALIZER SYSTEMS AND METHODS

Embodiments relate generally to systems and methods for adaptive equalization and, more particularly, to systems and methods for adaptive power, harmonic, and spur equalization using an electro-absorption modulator (EAM) adaptive equalizer in systems performing radio frequency (RF) to photonic conversion.

In a multi-channel or single channel broadband transmitter/receiver the RF frequency response flatness of the system can be important. Physical equalizers and automatic gain control (AGC) techniques in hardware implementations can be applied in order to minimize the gain deltas of a device. However, these techniques may have a great degree of variability in their effectiveness as they may rely heavily on the individual performance of the hardware (e.g., stepped attenuators or resistive equalizers). In addition, performance (e.g., precision) can be thresholded by physical limitations of the hardware (e.g., 1 dB attenuation step in a stepped attenuator). RF to photonic (or RF to optical) conversion technologies may suffer from problems similar to those described above. A need may exist to improve the flatness response and performance of systems employing RF to photonic conversion technologies.

One embodiment includes a communication system that can include a modulator, a processor coupled to the modulator, and a memory coupled to the processor. The memory can store software instructions that, when executed by the processor, cause the processor to perform operations. The operations can include generating, for each of one or more scan frequencies of interest, an optimal bias setting of the modulator. Data can be received at the processor indicating a selection of a range of frequencies to be processed by the communication system. An optimal bias setting corresponding to the selected range of frequencies can be determined responsive to the receiving. A bias of the modulator can be adjusted based on the determined optimal bias setting, thereby providing adaptive equalization of the flatness response of the communication system.

Another embodiment can include an adaptive equalizer. The adaptive equalizer can be configured to be coupled to a photonic radio frequency (RF) converter that can include a modulator. The adaptive equalizer can include a modulator bias controller, a processor coupled to the modulator bias controller, and a memory coupled to the processor. The memory can store software instructions that, when executed by the processor, cause the processor to perform operations. The operations can include generating, for each of one or more scan frequencies of interest, an optimal bias setting of the modulator. Each generated optimal bias setting of the modulator can be stored, in the memory, in a lookup table. A tuning word/command can be received at the processor that indicates a selected range of frequencies to be processed by the photonic RF converter. Responsive to the receiving, the optimal bias setting of the modulator corresponding to the selected range of frequencies indicated by the tuning word/command can be selected from the lookup table. A bias of the modulator can be adjusted via the modulator bias controller based on the selected optimal bias setting, the adjusting the bias of the modulator providing adaptive equalization of the flatness response of the photonic RF converter.

Another embodiment can include a method for adaptive equalization in a communication system that includes a photonic radio frequency (RF) converter that includes a modulator. The method can include generating, at a processor of the communication system, for each of one or more scan frequencies of interest, an optimal modulator bias setting. Data can be received at the processor that indicates a selected range of frequencies to be processed by the communication system. Responsive to the receiving, the optimal modulator bias setting corresponding to the selected range of frequencies can be determined. Responsive to the determining, a bias of the modulator can be adjusted based on the selected optimal modulator bias, the adjusting causing the modulator to adaptively equalize the flatness response of the photonic RF converter.

Another embodiment can include a nontransitory computer readable medium having stored thereon software instructions that, when executed by a processor of a communication system comprising the processor and an optical modulator, cause the processor to perform operations. The operations can include generating, for each of one or more scan frequencies of interest, an optimal bias setting. The operations can also include receiving, at the processor, data indicating a selected range of frequencies to be processed. The optimal bias setting corresponding to the selected range of frequencies can be selected in response to the receiving. Responsive to the selecting, a bias of the optical modulator can be adjusted based on the selected optimal bias, the adjusting causing the optical modulator to adaptively equalize a flatness response of the communication system

DETAILED DESCRIPTION

Figure 1:
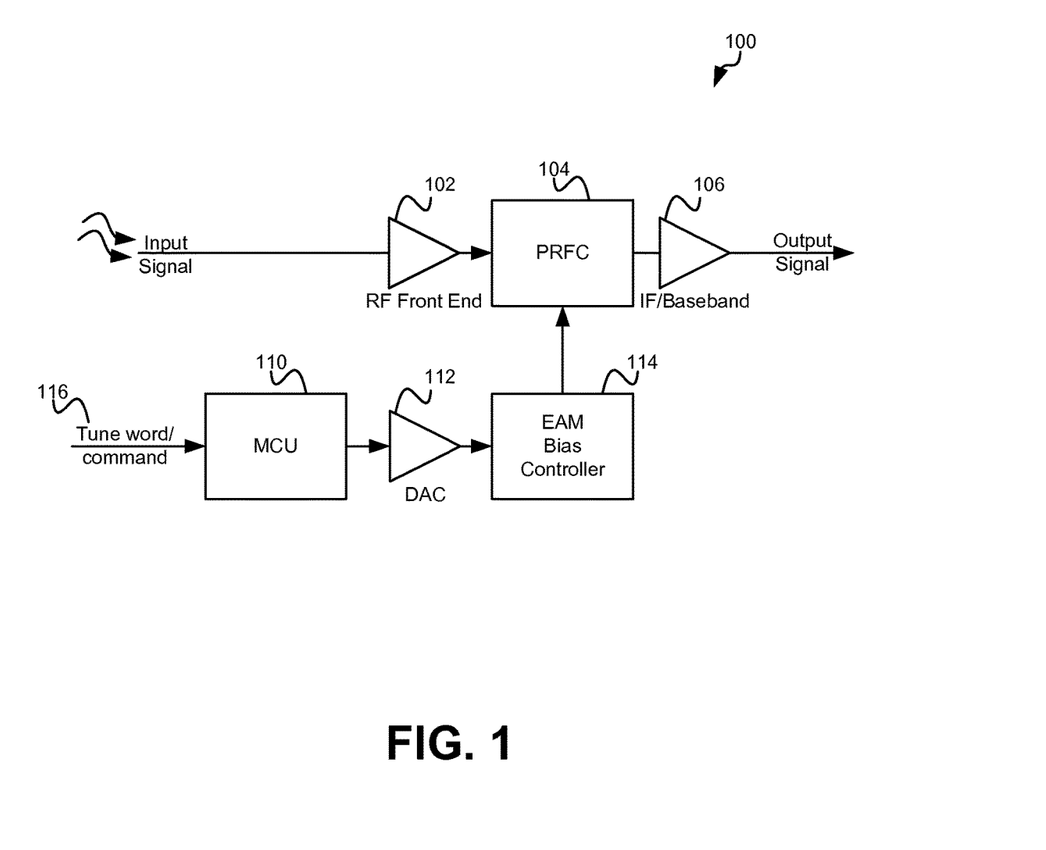
FIG. 1 is a block diagram of an exemplary embodiment of a communication system configured to perform adaptive equalization.

FIG. 1 is a block diagram of an exemplary embodiment of a communication system configured to perform adaptive equalization. System 100 can include an RF front end 102, a photonic RF converter (or "PRFC") 104, an IF/baseband 106, a microcontroller unit (or "MCU") 110, a digital-to-analog converter (or "DAC") 112, and an EAM bias controller (or "bias controller") 114. MCU 110 can receive a tune word/command 116 and transmit data to DAC 112. DAC 112 can receive data from MCU 110 and transmit a signal to EAM bias controller 114. EAM bias controller 114 can receive the signal from DAC 112 and transmit a bias control signal to PRFC 104. PRFC 104 can receive the bias control signal from bias controller 114, receive an input signal via RF front end 102, and transmit an output signal via IF/baseband 106.

Figure 4:
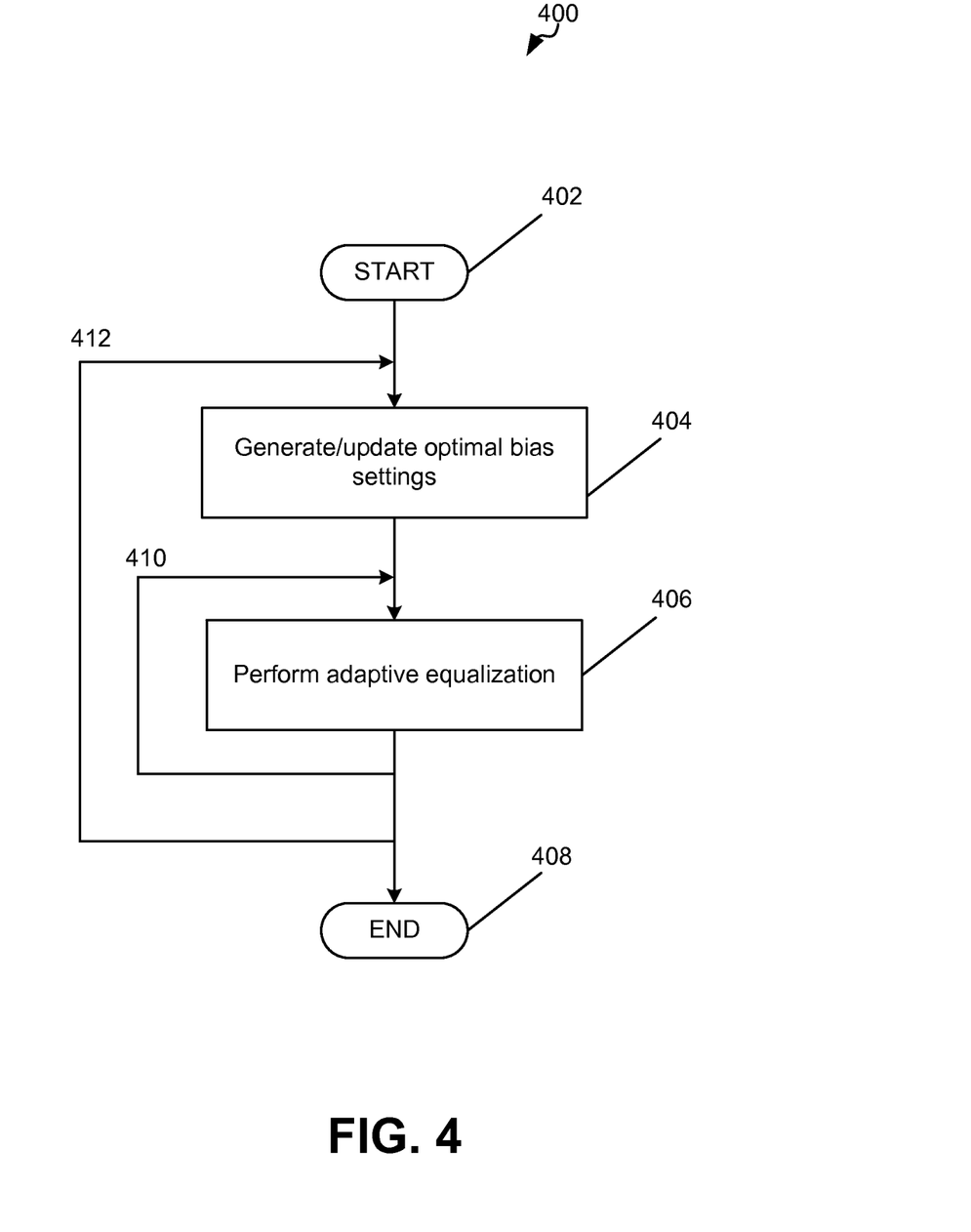
FIG. 4 is a flowchart showing an exemplary method for adaptive equalization of a communication system.
Figure 5:
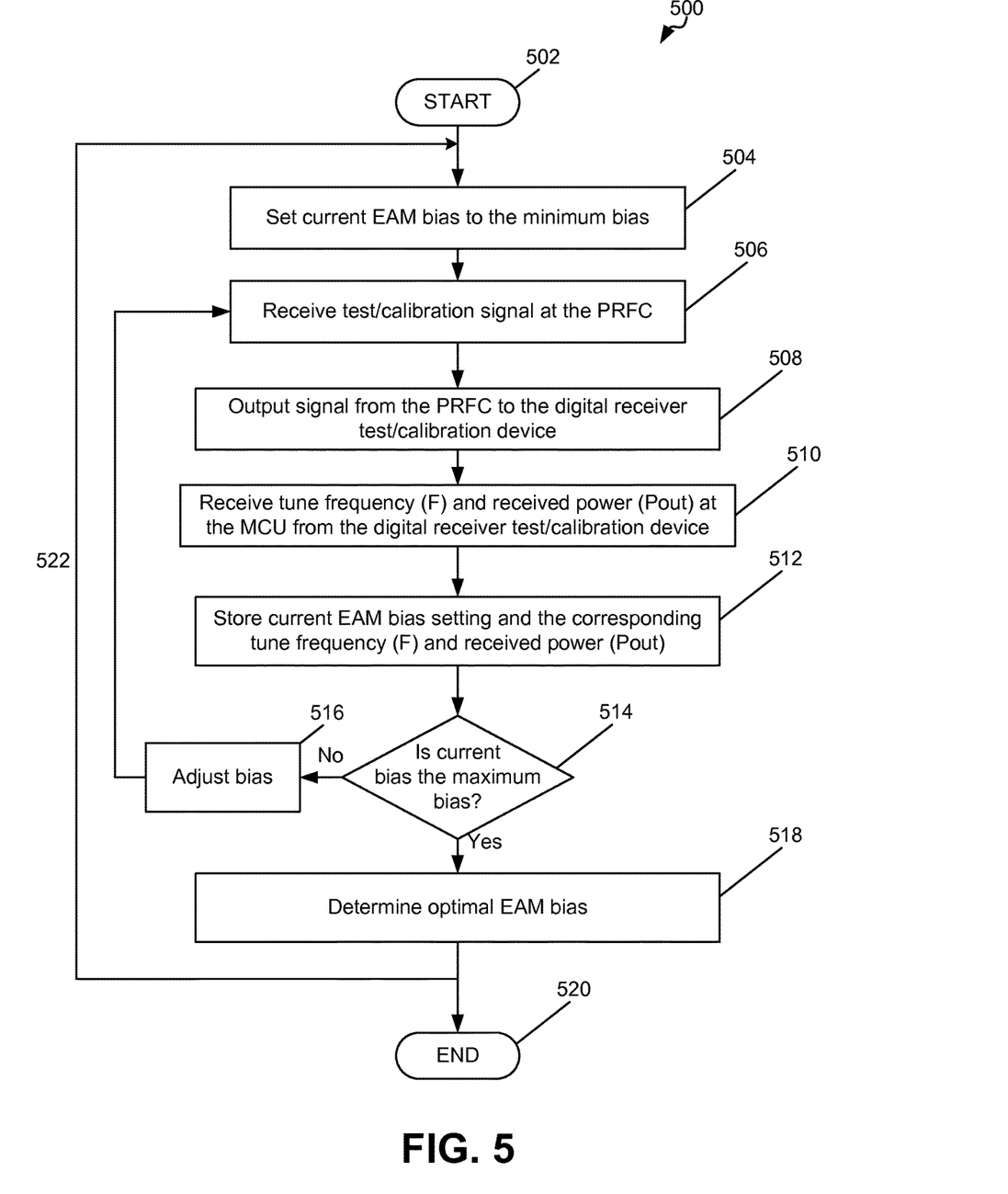
FIG. 5 is a flowchart showing an exemplary method for generating optimal bias settings used for performing adaptive equalization.
Figure 6:
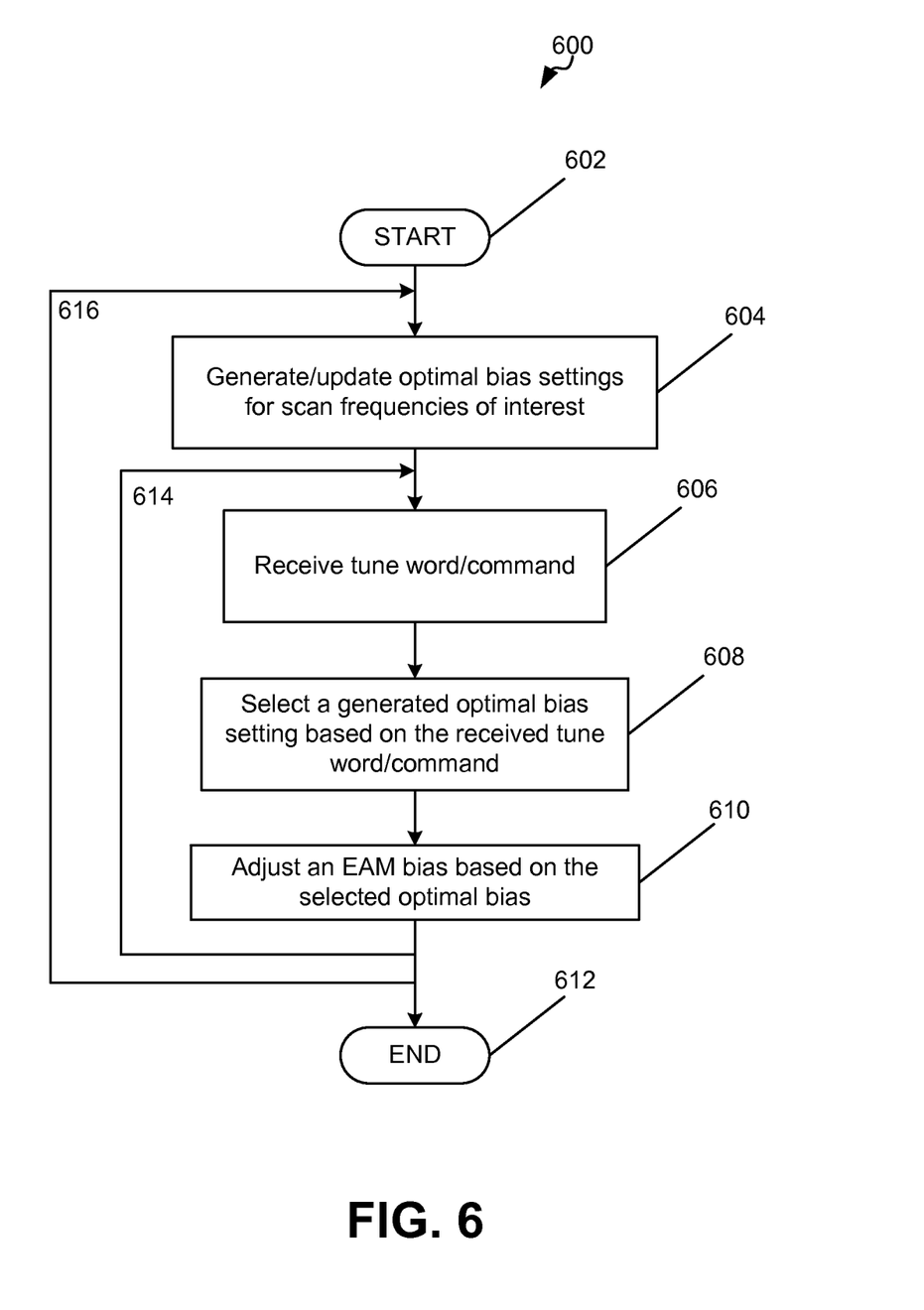
FIG. 6 is a flowchart showing an exemplary method for adaptively adjusting a bias of a communication system to perform adaptive equalization.

In operation, MCU 110 can receive tune word/command 116 and perform adaptive equalization by adjusting an EAM DC bias of PRFC 112 to an optimal bias selected based on the received tune word/command 116, according to the processes shown in FIGS. 4-6. Tune word/command 116 can indicate a selected range of frequencies to be processed by PRFC 104, and MCU 110 can adjust the EAM DC bias of PRFC 104 to an optimal bias based on the selected range of frequencies according to the processes shown in FIGS. 4-6.

In some embodiments, MCU 110 can adjust the EAM DC bias of PRFC 112 via DAC 112 and EAM bias controller 114. For example, MCU 110 can adjust the EAM DC bias of PRFC 112 to a desired (e.g., optimal) bias by transmitting bias setting data indicating the desired bias to DAC 112; DAC 112 can receive the data and, in response, output a corresponding signal to EAM bias controller 114. In response to the signal received from DAC 113, EAM bias controller 114 can transmit a bias control signal to PRFC 104 setting the EAM DC bias of PRFC 104 to the desired bias.

Some embodiments (such as, for example, the embodiment shown in FIG. 1) leverage the technical features of electro-absorption modulators to achieve RF to photonic converter (PRFC) adaptive equalization by adjusting the DC bias setpoint of an EAM in the PRFC (e.g., to an optimal bias setpoint). By performing adaptive equalization in such a manner, such embodiments have a high degree of repeatability offering a competitive advantage over traditional equalization techniques. In such embodiments, the optimal bias setpoint can also be generated/selected to eliminate/mitigate second and/or third order products. Such embodiments provide a large range of precision, which may be limited by the range of selected digital to analog conversion technology.

In some embodiments, a different type of modulator such as, for example, a phase modulator or other optical modulator can be used in PRFC 104 in place of or in addition to an EAM to achieve adaptive equalization. For example, in some embodiments, the use of a phase modulator in place of an EAM can provide advantages over traditional techniques similar to those discussed herein with regard to the use of EAMs.

In embodiments in which PRFC 104 includes a modulator other than an EAM such as, for example, a phase modulator, bias controller 114 can be configured to adjust the DC bias of the modulator (e.g., phase modulator) of PRFC 104 to achieve PRFC adaptive equalization according to the processes shown in FIGS. 4-6.

In some embodiments, PRFC 104 can include multiple modulators, such as, for example, one or more EAMs and/or one or more phase modulators. In some such embodiments, bias controller 114 can be configured to control one or more of the modulators of PRFC 104. In some embodiments in which multiple modulators are included in PRFC 104, system 100 can include, although not shown, more than one bias controller 114 coupled to MCU 110 to control the multiple modulators of PRFC 104.

Figure 2:
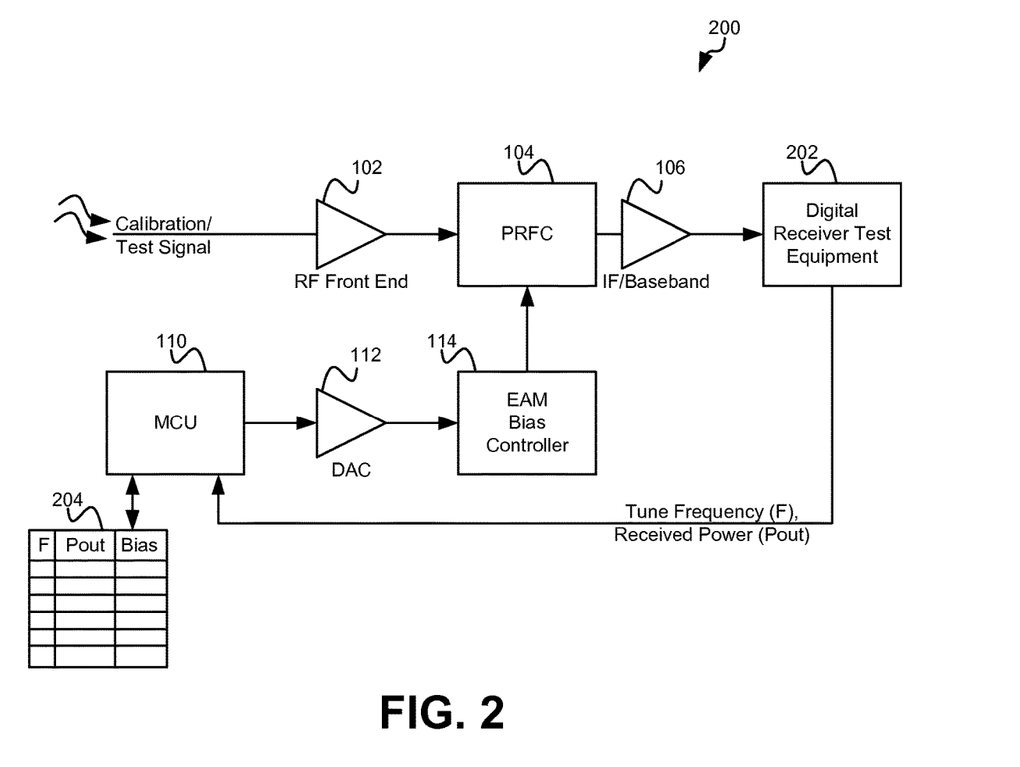
FIG. 2 is a block diagram of an exemplary embodiment of a communication system configured to perform adaptive equalization employing a digital feedback loop in a calibration scheme.

FIG. 2 is a block diagram of an exemplary embodiment of a communication system configured to perform adaptive equalization employing a digital feedback loop in a calibration scheme. System 200 can include RF front end 102, PRFC 104, IF/baseband 106, a digital receiver test/calibration device 202, MCU 110, DAC 112, EAM bias controller 114, and an optimal bias look-up table 204. Digital receiver test/calibration device 202 can receive an output signal from PRFC 104 via IF/baseband 106 and transmit data to MCU 110. MCU 110 can receive data from digital receiver test/calibration device 108 and transmit data to DAC 112. DAC 112 can receive data from MCU 110 and transmit a signal to EAM bias controller 114. EAM bias controller 114 can receive the signal from DAC 112 and transmit an EAM DC bias setting signal to PRFC 104. PRFC 104 can receive the EAM DC bias setting signal from EAM bias controller 114, receive a calibration/test signal via RF front end 102, and transmit an output signal to digital receiver test/calibration device 202 via IF/baseband 106.

In operation, MCU 110 can receive tune frequency (F) and/or received power (Pout) data from digital receiver test/calibration device 202, determine an optimal bias setting based on the tune frequency (F) and/or received power (Pout), and store the optimal bias setting in look-up table 116 to generate optimal bias settings for scan frequencies of interest, according to the processes shown in FIGS. 4-6.

Figure 3:
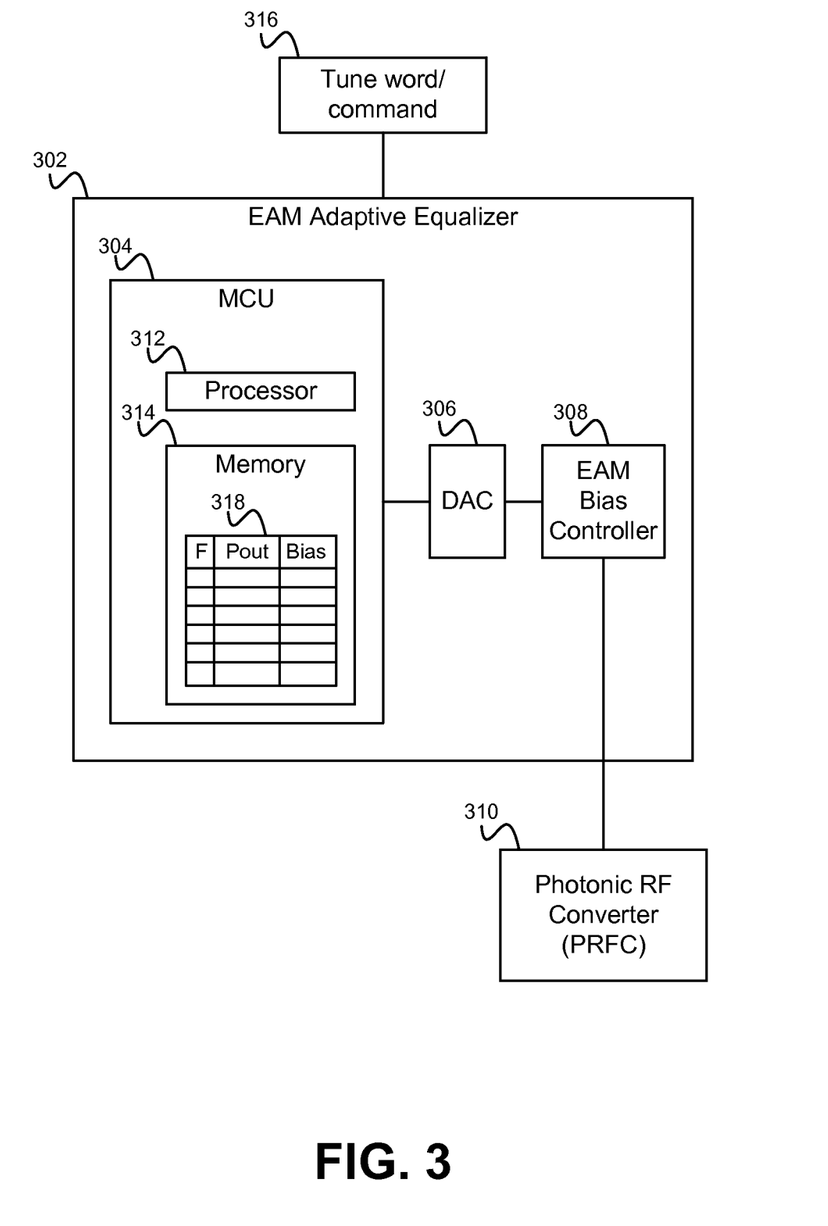
FIG. 3 is a block diagram of an exemplary embodiment of an EAM adaptive equalizer.

It will be appreciated that, although not shown, MCU 110 can include a memory, such as memory 314 shown in FIG. 3, and it will also be appreciated that look-up table 204 can be stored in such a memory.

FIG. 3 is a block diagram of an exemplary embodiment of an EAM adaptive equalizer. System 300 can include a PRFC 310 and an EAM adaptive equalizer 302. EAM adaptive equalizer 302 can include an MCU 304, a DAC 306, and an EAM bias controller 308. MCU 304 can include a processor 312 and a memory 314. Memory 314 can store optimal bias look-up table 318. MCU 304 can receive tune word/command 316 and MCU 304 can transmit data to DAC 306. DAC 306 can output a signal to EAM bias controller 308 based on the data received from MCU 304. EAM bias controller 308 can transmit a signal to PRFC 310 based on the signal received from DAC 306.

In operation, the processor 312 will execute instructions stored on the memory 314 that cause the MCU 304 to, in response to receiving tune word/command 316, adjust an EAM DC bias of PRFC 310 to adaptively equalize the output of PRFC 310 according to the processes shown in FIGS. 4-6.

It will be appreciated that, although not shown, EAM adaptive equalizer 302 can be included in a communication system employing a digital feedback loop in a calibration scheme to generate/update optimal bias settings to be used to perform adaptive equalization, as shown, for example, in FIG. 2.

FIG. 4 is a flowchart showing an exemplary method for adaptive equalization of a communication system 400. Processing begins at 402 and continues to 404.

At 404, optimal modulator bias settings are determined and/or updated. A lookup table, such as, for example, look-up table 204 or look-up table 314 in FIGS. 2 and 3, respectively, can be generated/updated to contain the optimal bias settings for each scan frequency of interest. The look-up table can be generated/updated as shown, for example, in FIG. 5 using a digital feedback loop in a calibration scheme, as shown, for example, in FIG. 2. The look-up table can be generated/updated using the internal calibration of a broad band communication system or during production testing. Processing continues to 406.

At 406, adaptive equalization is performed. The bias of a modulator of the communication system, such as, for example, an EAM of PRFC 104/310 shown in FIGS. 1-3, can be adjusted based on a selected range of frequencies to be processed by the communication system and the optimal modulator bias settings generated/updated at 404 as shown, for example, in FIG. 6. For example, adaptive equalization can be performed by, at an MCU such as, for example, MCU 110/304 shown in FIGS. 1-3, receiving a tune word selecting a range of frequencies to be processed, selecting an optimal bias setting from the look-up table generated at 404 based on the received tune word, and adjusting the EAM DC bias of the EAM in the PRFC using a DAC such as, for example, DAC 112/306 shown in FIGS. 1-3. Accordingly, the flatness response of the communication system can be adaptively equalized with a greater degree of freedom than traditional hardware based techniques. Processing continues to 408, where processing ends.

It will be appreciated that operations 404-406 may be repeated in whole or in part (examples of which are indicated by lines 410 and 412) to maintain current optimal modulator bias settings and/or maintain adaptive equalization of the communication system.

FIG. 5 is a flowchart showing an exemplary method 500 for generating optimal bias settings used for performing adaptive equalization. Processing begins at 502 and continues to 504.

At 504, the current EAM bias is set to the minimum bias voltage. Processing continues to 506.

At 506, a test/calibration signal is received at a PRFC such as, for example, PRFC 104 or PRFC 310 shown in FIGS. 1-3. Processing continues to 508.

At 508, a signal is output from the PRFC to a digital receiver test/calibration device such as, for example, digital receiver test/calibration device 202 shown in FIG. 2. Processing continues to 510.

At 510, tune frequency (F) and received power (Pout) are received at an MCU such as, for example, MCU 110 or MCU 304 shown in FIGS. 1-3, from the digital receiver test/calibration device. Processing continues to 512.

At 512, the received tune frequency (F) and received power (Pout) are stored with the corresponding current bias setting. The received tune frequency (F) and received power (Pout) can be stored with the corresponding current bias setting in a look-up table such as, for example, look-up table 204 or look-up table 314 shown in FIGS. 2 and 3, respectively. Processing continues to 514.

At 514, it is determined whether the current EAM bias setting is the maximum bias voltage. If the current bias setting is the maximum voltage, processing continues to 518, otherwise processing continues 516.

At 516, the EAM bias is adjusted. For example, the bias can be adjusted sequentially. Processing continues to 506.

At 518, an optimal EAM bias is determined. The optimal EAM bias can be determined based on the tune frequency (F) and received power (Pout) received from the digital receiver test/calibration device. For example the bias at which the peak amplitude occurs can be considered the optimal EAM bias at that particular frequency of the test signal (the tune frequency). Processing continues to 520, where processing ends.

Operations 504-518 can be repeated (as shown by line 522) for each desired frequency (e.g., each desired frequency in the operational range). For example, the optimal EAM bias can be determined through a calibration routine where the output of a test signal fed through the device is measured and the EAM bias is adjusted sequentially from its minimum to maximum bias voltage (e.g., 504-518). The bias at which the peak amplitude occurs can be considered the optimal EAM bias at that particular frequency of the test signal (e.g., 518). The process can then be repeated as shown, for example, by line 522 for each desired frequency (e.g., each desired frequency in the operational range), interpolating, if desired, for larger frequency step sizes.

In some embodiments, a look-up table such as, for example, look-up table 204 or look-up table 314 shown in FIGS. 2 and 3, respectively, can include only the optimal bias setting for each tune frequency. In some such embodiments, non-optimal bias settings can be removed from the look-up table once an optimal setting is determined at 518 or the data stored at 512 can be stored in a temporary location with the optimal bias setting determined at 518 being stored in the look-up table.

It will be appreciated that operations 504-518 may be repeated in whole or in part (an example of which is indicated by line 522) to maintain current optimal EAM bias settings.

FIG. 6 is a flowchart showing an exemplary method 600 for adaptively adjusting a bias of a communication system to perform adaptive equalization. Processing begins at 602 and continues to 604.

At 604, optimal bias settings can be generated and/or updated for one or more scan frequencies of interest, as shown, for example, in FIGS. 5 and 6. Processing continues to 606.

At 606, a tune word/command can be received. The tune word/command can indicate a selection of a range of frequencies to be processed by the communication system. Processing continues to 608.

At 608, an optimal bias setting is determined based on the received tune word/command. The optimal bias setting can be selected from the optimal bias settings generated at 604 based on the selected range of frequencies indicated in the tune word/command received at 606. Processing continues to 610.

At 610, an EAM bias is adjusted based on the selected optimal bias. The EAM DC bias of a PRFC, such as, for example, PRFC 104/310 shown in FIGS. 1-3, can be adjusted based on the optimal bias setting determined at 608 using a DAC such as, for example, DAC 112/306 shown in FIGS. 1-3. Processing continues to 612, where processing ends.

It will be appreciated that operations 604-610 may be repeated in whole or in part (examples of which are indicated by lines 614 and 616) to maintain current optimal modulator bias settings and/or maintain an appropriate bias for performing adaptive equalization of the communication system.

It will be appreciated that the modules, processes, systems, and sections described above can be implemented in hardware, hardware programmed by software, software instructions stored on a nontransitory computer readable medium or a combination of the above. A system for adaptive equalization, for example, can include using a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as C, Ada, Java, C++, C#.net or the like. The instructions can also comprise code and data objects provided in accordance with, for example, the Visual Basic™ language, or another structured or object-oriented programming language. The sequence of programmed instructions and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Exemplary structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a non-transitory computer readable medium).

Furthermore, embodiments of the disclosed method, system, and computer program product may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the computer programming and network security arts.

Moreover, embodiments of the disclosed method, system, and computer program product can be implemented in software executed on a programmed general purpose computer, a special purpose computer, a microprocessor, or the like.

It is, therefore, apparent that there is provided, in accordance with the various embodiments disclosed herein, computer systems, methods and software for adaptive equalization.

While the invention has been described in conjunction with a number of embodiments, it is evident that many alternatives, modifications and variations would be or are apparent to those of ordinary skill in the applicable arts. Accordingly, Applicants intend to embrace all such alternatives, modifications, equivalents and variations that are within the spirit and scope of the invention.

What is claimed is:

1. A communication system, comprising:
   a modulator;
   a processor coupled to the modulator; and
   a memory coupled to the processor, the memory having stored therein software instructions that, when executed by the processor, cause the processor to perform operations including:
      generating optimal bias settings of the modulator for frequencies of interest;
      storing the optimal bias settings in a lookup table;
      receiving, at the processor, data indicating a selected range of frequencies to be processed by the communication system;
      determining, responsive to the receiving, a first optimal bias setting from the optimal bias settings stored in the lookup table based on the selected range of frequencies by selecting the optimal bias settings from the lookup table; and
      adjusting a bias of the modulator based on the first optimal bias setting,
      the adjusting providing adaptive equalization of a flatness response of the communication system.

2. The communication system of claim 1, wherein the modulator is an electro-absorption modulator.

3. The communication system of claim 1, further comprising:
   a modulator bias controller coupled to the modulator; and
   a digital-to-analog converter coupled to the modulator bias controller and to the processor, the processor being coupled to the modulator controller via the digital-to-analog converter,
   wherein the adjusting the bias of the modulator based on the first optimal bias setting includes using the digital-to-analog converter and the modulator controller.

4. The communication system of claim 1, the operations further comprising:
   updating respective optimal bias settings of one or more of the frequencies of interest.

5. The communication system of claim 1, wherein the generating is performed during internal calibration of the communication system.

6. The communication system of claim 1, wherein the generating includes receiving data from a digital receiver coupled to the communication system in a digital feedback loop.

7. An adaptive equalizer configured to be coupled to a photonic radio frequency (RF) converter comprising a modulator, the adaptive equalizer comprising:
   a modulator bias controller;
   a processor coupled to the modulator bias controller; and
   a memory coupled to the processor, the memory having stored therein software instructions that, when executed by the processor, cause the processor to perform operations including
      generating optimal bias settings of the modulator for frequencies of interest;
      storing, in the memory, each of the generated optimal bias settings of the modulator in a lookup table;
      receiving, at the processor, a tuning word/command indicating a selected range of frequencies to be processed by the photonic RF converter;

selecting, from the lookup table and responsive to the receiving, a first optimal bias setting from the optimal bias settings of the modulator based on the selected range of frequencies indicated by the tuning word/command; and adjusting a bias of the modulator via the modulator bias controller based on the first optimal bias setting, the adjusting the bias of the modulator providing adaptive equalization of a flatness response of the photonic RF converter.

8. The adaptive equalizer of claim 7,
wherein the modulator is an electro-absorption modulator, and
wherein the adjusting includes changing a DC bias of the electro-absorption modulator via the modulator bias controller based on the first optimal bias setting.

9. The adaptive equalizer of claim 7, further comprising:
a digital-to-analog converter coupled to the modulator bias controller and to the processor, the processor being coupled to the modulator controller via the digital-to-analog converter,
wherein the adjusting includes transmitting data from the processor to the digital-to-analog converter, the data adapted to cause the digital-to-analog converter to transmit a signal to the modulator bias controller, the signal adapted to cause the modulator bias controller to transmit a bias control signal to the photonic RF converter, and the bias control signal configured to cause the photonic RF converter to adjust the bias of the modulator.

10. The adaptive equalizer of claim 7, the operations further comprising:
updating respective optimal bias settings of one or more of the frequencies of interest.

11. The adaptive equalizer of claim 7, wherein the generating is performed during internal calibration of the photonic RF converter.

12. The adaptive equalizer of claim 7, wherein the generating includes receiving data from a digital receiver coupled to the photonic RF converter and the adaptive equalizer in a digital feedback loop.

13. A method for adaptive equalization in a communication system having a photonic radio frequency (RF) converter that includes a modulator, the method comprising:
generating, at a processor of the communication system, optimal modulator bias settings for frequencies of interest;
storing, at a memory of the communication system coupled to the processor, the generated optimal modulator bias settings in a lookup table;
receiving, at the processor, data indicating a selected range of frequencies to be processed by the communication system;
determining, responsive to the receiving, a first optimal modulator bias setting from the optimal modulator bias settings stored in the lookup table based on the selected range of frequencies; and
adjusting, responsive to the determining, a bias of the modulator based on the first optimal modulator bias, the adjusting causing the modulator to adaptively equalize a flatness response of the photonic RF converter.

14. The method of claim 13, wherein the modulator is an electro-absorption modulator.

15. The method of claim 13,
wherein the communication system further comprises a digital-to-analog converter, and
wherein the adjusting is performed based on the first optimal modulator bias and via the digital-to-analog converter.

16. The method of claim 13, the method further comprising:
updating respective optimal modulator bias settings of one or more of the frequencies of interest.

17. The method of claim 13, wherein the generating is performed during internal calibration of the communication system.

18. The method of claim 13, wherein the modulator is a phase modulator.

19. A non-transitory computer readable medium having stored thereon software instructions that, when executed by a processor of a communication system, cause the processor to perform operations comprising:
generating optimal bias settings for frequencies of interest;
storing the generated optimal bias settings in a lookup table;
receiving, at the processor, data indicating a selected range of frequencies to be processed;
selecting, responsive to the receiving, a first optimal bias setting from the optimal bias settings stored in the lookup table based on the selected range of frequencies; and
adjusting, responsive to the selecting, a bias of an optical modulator of the communication system based on the selected optimal bias, the adjusting causing the optical modulator to adaptively equalize a flatness response of the communication system.

20. The computer program product of claim 19, wherein the optical modulator is an electro-absorption modulator.

21. The computer program product of claim 19,
wherein the communication system further comprises a digital-to-analog converter, and
wherein the adjusting includes using the digital-to-analog converter.

22. The computer program product of claim 19, the operations further comprising:
updating respective optimal bias settings of one or more of the frequencies of interest.

23. The computer program product of claim 19, wherein the generating is performed during internal calibration of the communication system.

24. The computer program product of claim 19, wherein the generating includes receiving data from a digital receiver coupled to the communication system in a digital feedback loop.

* * * * *